Patented Oct. 10, 1922.

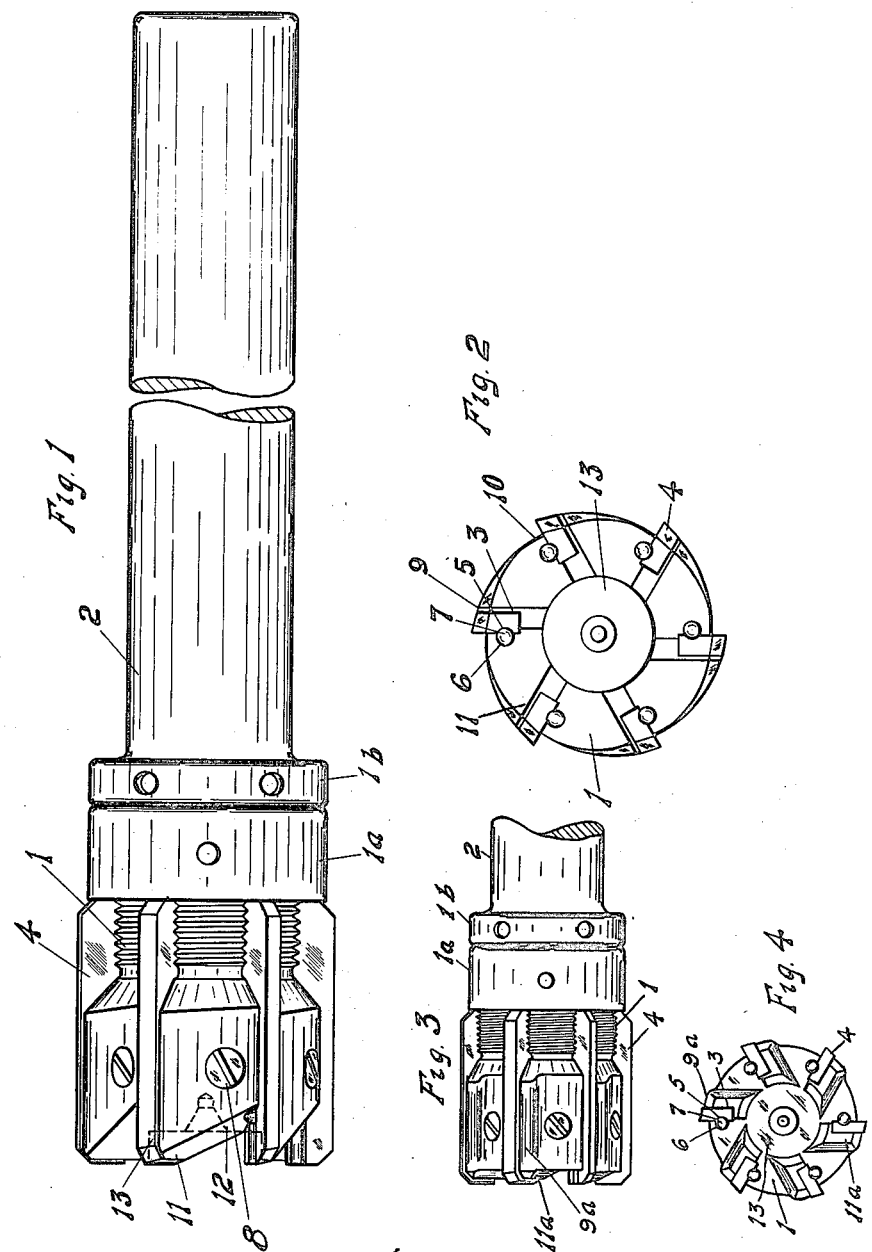

1,431,831

UNITED STATES PATENT OFFICE.

FRANK P. MILLER, OF MEADVILLE, PENNSYLVANIA.

CUTTING TOOL.

Application filed September 30, 1921. Serial No. 504,319. REISSUED

*To all whom it may concern:*

Be it known that I, FRANK P. MILLER, a citizen of the United States, residing at Meadville, in the county of Crawford and State of Pennsylvania, have invented new and useful Improvements in Cutting Tools, of which the following is a specification.

This invention is designed to improve adjustable cutting tools, particularly adjustable reamers. These tools have been formed with cutter heads or carriers in which there are formed grooves for receiving the cutters. Ordinarily the carrier or head is cylindrical in shape and has a plane face and the cutters extend sufficiently above and beyond the surface of the carrier to give the proper chip clearance adjacent to the cutting edges. With the present invention the carrier or head is formed with a backing extending out to a position on the cutter blades adjacent to a position back of the cutting edges so that the cutting blades are supported practically to their cutting edges. This backing is cut away from the point of support so that at the cutting face of the succeeding cutting blade there is ample chip clearance.

The invention is illustrated in the accompanying drawings as follows:—

Fig. 1 shows a side elevation of a cutting tool.

Fig. 2 an end view of such cutting tool.

Fig. 3 a view similar to Fig. 1 of a slightly modified construction.

Fig. 4 an end view of the same.

1 marks the head, 2 the shank with which the head is provided, 3 grooves arranged in the head, 4 cutting blades arranged in the grooves, 5 and 6 radial grooves in the blade and side walls of the grooves 3, 7 a locking fillet arranged in the grooves 5 and 6, and 8 screws operating on the locking fillet to lock the blades in place. Adjusting rings $1^a$ and $1^b$ are also supplied operating on the rear ends of the cutting blades. These blades may be slightly expanded as moved forward as is common, as shown in my Patent No. 1,244,227.

In the structure shown in Figs. 1 and 2 the periphery of the head has the backing portion 9 extending outwardly approximately to the outer rear edge of the blade thus giving the blade ample support. The backing is cut away at 10 so that there is ample chip clearance along the peripheral cutting edge of the succeeding blade. The end face of the reamer has a backing 11 which extends outwardly to position approximately opposite the end cutting edge of the blade. This backing is cut away at 12 giving ample chip clearance for the succeeding blade. The head is preferably provided with a peripheral bore 13 in its end to which the cut-away portions 12 extend, this also increasing the chip clearance.

In the alternative construction the backing $9^a$ corresponds in function to the backing 9. In the modification, however, the backing terminates in an abrupt shoulder instead of being carried gradually back to the face of the head. The blades are backed with the shoulder $11^a$ at the end instead of the shoulder 9 and here the same modification is resorted to, that is, the backing terminates in a comparatively abrupt shoulder instead of the long incline as shown in Figs. 1 and 2.

What I claim as new is:—

1. In an inserted blade reamer the combination of a carrier having a plurality of grooves, a cutter secured in each groove, each cutter extending axially and radially beyond the carrier, and portions of the carrier extending axially and radially behind each cutter approximately to the cutting edges, to support said cutter.

2. In an inserted blade reamer the combination of a carrier having a plurality of grooves, a cutter secured in each groove, each cutter extending axially beyond the carrier, and portions of the carrier extending axially behind each cutter approximately to the cutting edges to support said cutter.

In testimony whereof I have hereunto set my hand.

FRANK P. MILLER.